United States Patent
Davis et al.

(10) Patent No.: US 7,530,337 B1
(45) Date of Patent: May 12, 2009

(54) HIGH OVERLAP CAMSHAFT FOR IMPROVED ENGINE EFFICIENCY

(75) Inventors: Richard Stephen Davis, Lake Orion, MI (US); Ronald J. Herrin, Troy, MI (US); Gary J. Patterson, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/103,304

(22) Filed: Apr. 15, 2008

(51) Int. Cl.
    *F01L 1/00* (2006.01)
(52) U.S. Cl. ..................... 123/90.1; 123/321
(58) Field of Classification Search ..... 123/90.1–90.67, 123/321
    See application file for complete search history.

(56) References Cited

U.S. PATENT DOCUMENTS

| | | | | |
|---|---|---|---|---|
| 4,332,222 A | * | 6/1982 | Papez | 123/90.17 |
| 5,184,581 A | * | 2/1993 | Aoyama et al. | 123/90.31 |
| 2004/0094106 A1 | * | 5/2004 | Asai et al. | 123/90.15 |
| 2008/0017150 A1 | * | 1/2008 | Tsuchida et al. | 123/90.17 |

* cited by examiner

*Primary Examiner*—Erick Solis

(57) ABSTRACT

A vehicle may include a drive axle, an engine assembly, a coupling device, and an engine load management system. The engine assembly may include a valvetrain including a fixed-lobe camshaft and intake and exhaust valves supported by the engine assembly. The fixed-lobe camshaft may include a first lobe engaged with the intake valve to open the intake valve and a second lobe engaged with the exhaust valve to open the exhaust valve. The first and second lobes may be fixed relative to one another to define a constant valve overlap condition that provides for opening of the intake valve before the exhaust valve is fully closed, creating an engine operating condition that results in combustion instability below an engine load limit. The engine load management system may be in communication with the engine to prevent engine operation below the engine load limit.

20 Claims, 2 Drawing Sheets

HIGH OVERLAP CAMSHAFT FOR IMPROVED ENGINE EFFICIENCY

FIELD

Figure 1:
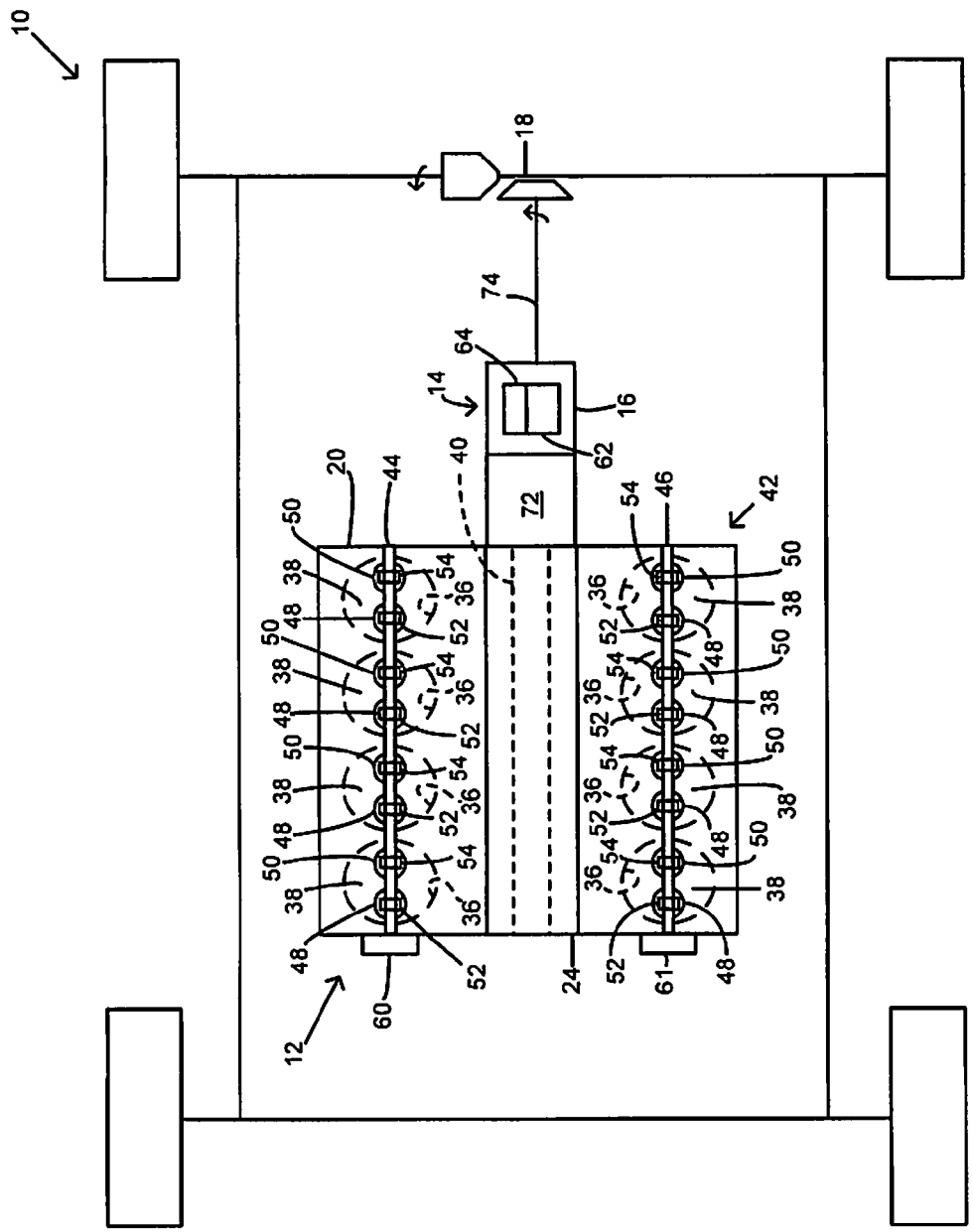

The present disclosure relates to camshaft profiles, and more specifically to improving engine efficiency in vehicles based on camshaft profiles and engine load.

BACKGROUND

The statements in this section merely provide background information related to the present disclosure and may not constitute prior art.

Engine assemblies typically include one or more camshafts that actuate intake and exhaust valves. Providing an overlap between intake and exhaust valve opening may provide efficiency gains at partial engine load conditions and power gains at high engine load conditions. However, the amount of overlap is limited by low engine load conditions due to combustion stability concerns, especially at low engine speeds.

SUMMARY

A vehicle may include a drive axle, an engine assembly, a coupling device, and an engine load management system. The engine assembly may include an engine block that defines a cylinder, a piston disposed within the cylinder, a crankshaft rotatably driven by the piston, and a valvetrain including a fixed-lobe camshaft and intake and exhaust valves supported by the engine assembly. The intake and exhaust valves may be in communication with the cylinder. The fixed-lobe camshaft may include a first lobe engaged with the intake valve to open the intake valve and a second lobe engaged with the exhaust valve to open the exhaust valve. The first and second lobes may be fixed relative to one another to define a constant valve overlap condition that provides for opening of the intake valve before the exhaust valve is fully closed. The duration of the valve overlap condition may create an engine operating condition that results in combustion instability when the engine is operated below an engine load limit. The engine load management system may be in communication with the engine to prevent engine operation below the engine load limit.

A method may include providing a valve overlap condition between intake and exhaust valves for a cylinder of an engine that results in combustion instability when the engine is operated below an engine load limit. A vehicle associated with the engine may be operated in a first operating mode when a load applied to the engine to propel the vehicle is greater than the engine load limit. The method may further include determining when a load applied to the engine to propel the vehicle is below the engine load limit and operating the vehicle in a second operating mode when the load applied to the engine to propel the vehicle is below the engine load limit. The second operating mode may include applying a supplemental load to the engine to prevent operation below the engine load limit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
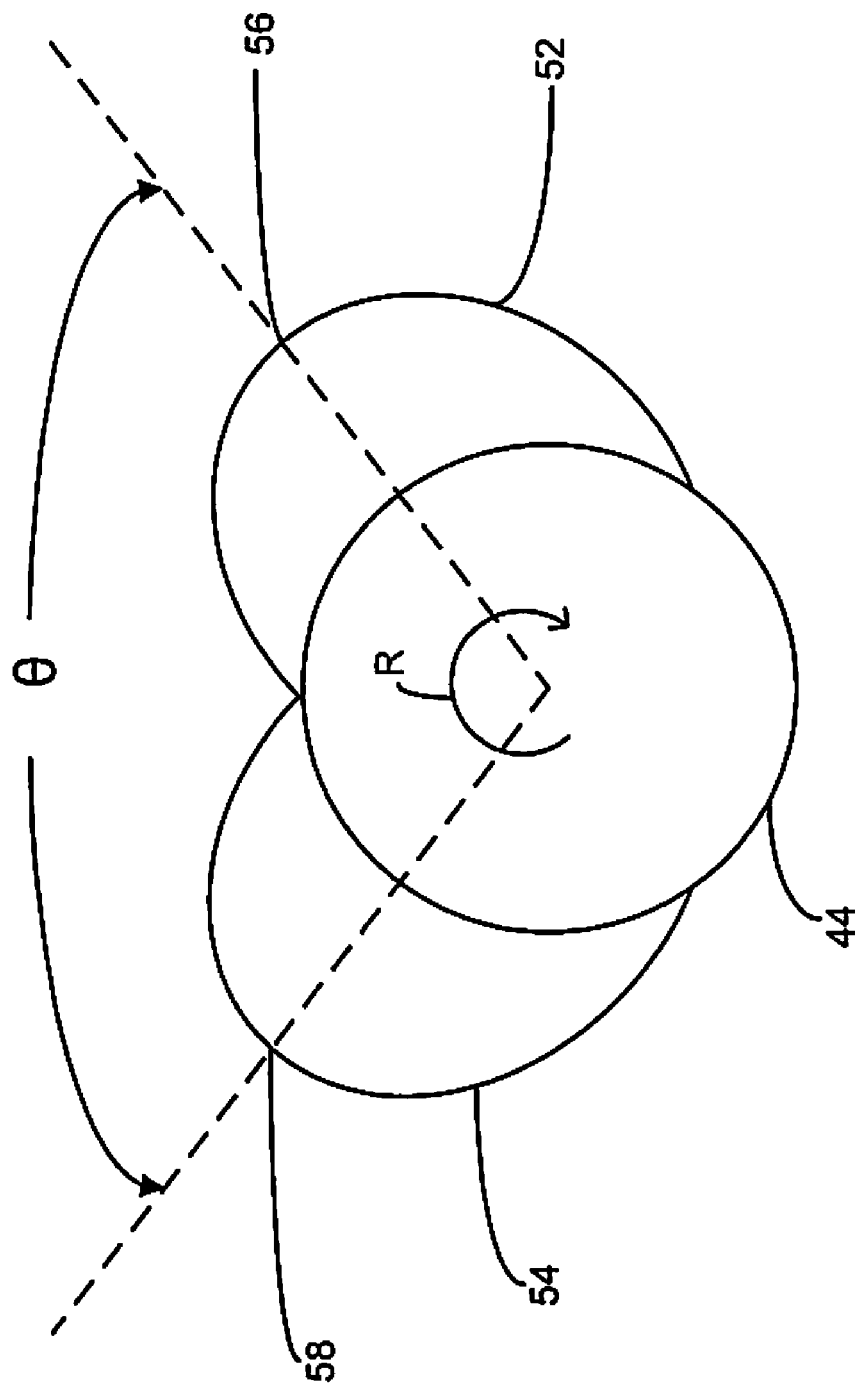

FIG. 1 is a schematic illustration of a vehicle according to the present disclosure; and FIG. 2 is a schematic illustration of a camshaft of the vehicle shown in FIG. 1.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary vehicle 10 is schematically illustrated. The vehicle 10 may include an engine assembly 12, an optional hybrid power assembly 14, a transmission 16, and a drive axle 18. The engine assembly 12 may include an internal combustion engine 20.

The engine 20 may include an engine block 24 that defines a plurality of cylinders 36, a piston 38 disposed within each of the cylinders 36, a crankshaft 40 in driven engagement with the pistons 38, and a valvetrain assembly 42. The valvetrain assembly 42 may include first and second camshafts 44, 46 and exhaust and intake valves 48, 50 associated with each of the cylinders 36. The first and second camshafts 44, 46 may be generally similar to one another. Therefore, the first camshaft 44 will be discussed with the understanding that the description applies equally to the second camshaft 46. While the engine 20 is shown as an overhead cam engine, it is understood that the present disclosure may additionally apply to other engine configurations such as cam-in-block engines.

The first camshaft 44 may include a fixed-lobe camshaft having exhaust and intake lobes 52, 54 that are fixed for rotation with one another. The exhaust lobes 52 may be engaged with the exhaust valves 48 and the intake lobes 54 may be engaged with the intake valves 50 to open the exhaust and intake valves 48, 50. With reference to FIG. 2, the pair of exhaust and intake lobes 52, 54 for each cylinder 36 may be orientated relative to one another to provide an overlap between the opening of the exhaust and intake valves 48, 50 for the cylinder 36. For example, the exhaust lobe 52 may have a first peak 56 and the intake lobe 54 may have a second peak 58. The first peak 56 may be rotationally offset from the second peak 58 in rotational direction (R) by an angle (θ). The angle (θ) may be less than an angle needed to maintain combustion stability at engine loads below an engine load limit.

The engine load limit may generally correspond to a light load, where the overlap between the opening of the exhaust and intake valves 48, 50 may allow recirculation of an unacceptable residual mass fraction from the exhaust gas. The high residual mass fraction may slow down the combustion process and lead to combustion instability. For example, stationary vehicle, vehicle coasting, and low-load cruise conditions may correspond to engine loads required to propel the vehicle 10 that are below the engine load limit. Stationary vehicle conditions may generally correspond to a normal idle condition for a vehicle. Engine brake torque values of approximately zero or less may additionally correspond to engine load conditions below the engine load limit.

By way of non-limiting example, the hybrid power assembly 14 may prevent engine operation below the engine load limit and may include an electric motor 62 and a rechargeable battery 64. The electric motor 62 and the rechargeable battery 64 may form a drive mechanism for the hybrid power assembly 14. The motor 62 may be in electrical communication with the battery 64 to convert power from the battery 64 to mechanical power. The motor 62 may additionally be powered by the engine 20 and operated as a generator to provide power to charge the battery 64. The hybrid power assembly 14 may be incorporated into and engaged with the transmission 16. The motor 62 may be coupled to the output shaft 74 to power rotation of the drive axle 18 via the transmission 16.

The engine assembly 12 may be coupled to the transmission 16 via a coupling device 72 and may drive the transmission 16. The coupling device 72 may include a friction clutch or a torque converter. The transmission 16 may use the power provided from the engine 20 and/or the motor 62 to drive the output shaft 74 and power rotation of the drive axle 18.

In a first operating mode, the crankshaft 40 may drive the output shaft 74 through combustion within the cylinders 36. In a second operating mode, the engine 20 may be decoupled from the transmission 16 and the electric motor 62 may drive the output shaft 74. The engine 20 may be shut off during the second operating mode. In a third operating mode, the engine 20 may drive the electric motor 62 to charge the battery 64 and may drive the output shaft 74. Alternatively, when the battery 64 has a charge level greater than a predetermined level, a fourth operating mode may be provided where the electric motor 62 and the engine 20 both drive the output shaft 74. The combination of the normal engine operating load and the load applied by the electric motor 62 during the third operating mode may provide a total engine load during the third operating mode that is greater than the engine load limit.

The exhaust and intake valves 48, 50 may optionally be part of a cylinder deactivation system (not shown) where the exhaust and intake valves 48, 50 associated with a portion of the cylinders 36 are not operated. The hybrid power assembly 14 and the cylinder deactivation system may be used in combination or independently from one another to form an engine load management system for the vehicle 10. It is understood that the engine load management system is not limited to the hybrid power assembly 14 or the cylinder deactivation system and that various alternate load management mechanisms may be used while remaining within the scope of the present disclosure. For example, in the engine 20 shown in FIG. 1, the exhaust and intake valves 48, 50 associated with one-half (four) of the cylinders 36 may be inoperable when operated in a cylinder-deactivation mode. The engine 20 may be operated in the cylinder deactivation mode to increase a net load on the firing cylinders. The increased net load may be greater than the engine load limit. The engine assembly 12 may further include cam phasers 60, 61 for the first and second camshafts 44, 46. The cam phasers 60, 61 may include dual-equal phasers since the exhaust and intake lobes 52, 54 may be fixed for rotation with one another. Therefore, when the first and second camshafts 44, 46 are advanced or retarded, the exhaust and intake lobes 52, 54 move with one another. Further, it is understood that the teachings of the present disclosure may apply to concentric camshaft designs as well, where intake and exhaust lobes are rotatable relative to one another.

The overlap of the opening of the exhaust and intake valves 48, 50 may increase the power output of the engine 20 when the engine 20 is operated above the engine load limit at full load conditions. The overlap may also increase the fuel economy and/or reduce emissions at part load conditions. The power output, efficiency, and emissions gains may be relative to an engine having a camshaft with intake and exhaust lobes that provide an opening overlap that provides combustion stability at engine loads below the engine load limit discussed above.

During operation, the engine 20 may either be shut off or may experience an additional load from the engine load management system during periods when the engine 20 would typically experience engine loads below the engine load limit. As discussed above, the engine load management system may include the hybrid power assembly 14 and/or the cylinder deactivation system. For example, when the engine 20 would typically experience a load that is less than the engine load limit, an additional load may be applied to the engine by operating the engine 20 in the third operating mode and/or operating the engine 20 in a cylinder deactivation mode to increase the engine load on the activated cylinders to a level greater than the engine load limit. Alternatively, the engine 20 may be shut off during periods when the operating load would be less than the engine load limit. When the engine 20 is shut off, the electric motor 62 may power the vehicle 10.

What is claimed is:

1. A vehicle comprising:
   a drive axle;
   an engine assembly including:
      an engine block defining a cylinder;
      a piston disposed within the cylinder;
      a crankshaft rotatably driven by the piston; and
      a valvetrain including a fixed-lobe camshaft and intake and exhaust valves supported by the engine assembly, the intake and exhaust valves being in communication with the cylinder and the fixed-lobe camshaft including a first lobe engaged with the intake valve to open the intake valve and a second lobe engaged with the exhaust valve to open the exhaust valve, the first and second lobes being fixed relative to one another to define a constant valve overlap condition that provides for opening of the intake valve before the exhaust valve is fully closed, a duration of the valve overlap condition creating an engine operating condition that results in combustion instability when the engine is operated below an engine load limit; and
   an engine load management system in communication with the engine to prevent engine operation below the engine load limit.

2. The vehicle of claim 1, wherein the engine load management system includes a coupling device and a hybrid drive assembly, the coupling device providing engagement between the crankshaft and the drive axle during a first operating mode and disengaging the crankshaft from the drive axle during a second operating mode, the hybrid drive assembly including a drive mechanism engaged with one of the drive axle and the crankshaft to prevent engine operation below the engine load limit.

3. The vehicle of claim 2, wherein the drive mechanism is engaged with the crankshaft during the first operating mode to apply an additional load to the engine and increase a total load on the engine to a level greater than the engine load limit.

4. The vehicle of claim 3, wherein the drive mechanism includes an electric motor and a battery in electrical communication with the electric motor, the crankshaft driving the electric motor to charge the battery during the first operating mode.

5. The vehicle of claim 4, wherein the first operating mode corresponds to an engine idle condition.

6. The vehicle of claim 2, wherein the second operating mode corresponds to an engine load that is less than the engine load limit, the engine being shut off during the second operating mode and the drive mechanism being engaged with the drive shaft to power the vehicle.

7. The vehicle of claim 6, wherein the second operating mode corresponds to a vehicle coasting condition.

8. The vehicle of claim 6, wherein the second operating mode corresponds to a stationary vehicle condition.

9. The vehicle of claim 1, wherein a level of exhaust gas remaining in the cylinder from the valve overlap condition creates the combustion instability.

10. The vehicle of claim 1, wherein the engine block defines at least two cylinders, the engine load management system including a cylinder deactivation system formed by the valvetrain and operable in a full cylinder mode and a deactivated mode where at least one of the cylinders is deactivated to create an increased load on the remaining cylinders, the engine assembly being operated in the deactivated mode to maintain an engine load above the engine load limit.

11. The vehicle of claim 10, wherein the engine load management system includes a coupling device and a hybrid drive assembly, the coupling device providing engagement between the crankshaft and the drive axle during a first operating mode and disengaging the crankshaft from the drive axle during a second operating mode, the hybrid drive assembly including a drive mechanism engaged with one of the drive axle and the crankshaft to prevent engine operation below the engine load limit, the engine assembly being operated in the deactivated mode during the first operating mode.

12. The vehicle of claim 10, wherein the engine assembly is operated in the deactivated mode during a stationary vehicle condition to maintain an engine load above the engine load limit.

13. The vehicle of claim 10, wherein the engine assembly is operated in the deactivated mode during a vehicle coasting condition to maintain an engine load above the engine load limit.

14. A method comprising:
providing a valve overlap condition between intake and exhaust valves for a cylinder of an engine that results in combustion instability when the engine is operated below an engine load limit;
operating a vehicle associated with the engine in a first operating mode when a load applied to the engine to propel the vehicle is greater than the engine load limit;
determining when a load applied to the engine to propel the vehicle is below the engine load limit; and
operating the vehicle in a second operating mode when the load applied to the engine to propel the vehicle is below the engine load limit, the second operating mode including applying a supplemental load to the engine to prevent operation below the engine load limit.

15. The method of claim 14, wherein the vehicle is a hybrid vehicle including a drive mechanism and further comprising shutting off the engine and engaging the drive mechanism with a drive axle of the vehicle to propel the vehicle when the load applied to the engine to propel the vehicle is below the engine load limit.

16. The method of claim 14, wherein the vehicle is a hybrid vehicle including a drive mechanism and the second operating mode includes engaging the drive mechanism with a crankshaft of the engine to apply the supplemental load to the engine.

17. The method of claim 16, wherein the hybrid vehicle includes an electric motor and a battery in communication with the electric motor, the crankshaft driving the electric motor to charge the battery during the second operating mode.

18. The method of claim 14, wherein the engine defines at least two cylinders and includes a valvetrain forming a cylinder deactivation system operable in a full cylinder mode and a deactivated mode where at least one of the cylinders is deactivated to create an increased load on the remaining cylinders, the second operating mode including operating the engine in the deactivated mode to maintain an engine load above the engine load limit.

19. The method of claim 14, wherein the second operating mode corresponds to a vehicle coasting condition.

20. The method of claim 14, wherein the second operating mode corresponds to a stationary vehicle condition.

* * * * *